(12) United States Patent
Kramer et al.

(10) Patent No.: US 7,395,730 B2
(45) Date of Patent: Jul. 8, 2008

(54) CONTROL OF AN AUTOMATIC TRANSMISSION BY THE EVALUATION OF THE SPEED OF ACTIVATION OF THE GEAR STAGE RANGE

(75) Inventors: Rupert Kramer, Friedrichshafen (DE); Wolfgang Gröner, Friedrichshafen (DE); Stefan Veittinger, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 233 days.

(21) Appl. No.: 11/283,615

(22) Filed: Nov. 21, 2005

(65) Prior Publication Data

US 2006/0111219 A1   May 25, 2006

(30) Foreign Application Priority Data

Nov. 25, 2004   (DE)   ........................ 10 2004 056 927

(51) Int. Cl.
*F16H 59/36* (2006.01)
(52) U.S. Cl. ........................................................ 74/335
(58) Field of Classification Search ................... 477/908
See application file for complete search history.

(56) References Cited

U.S. PATENT DOCUMENTS

| | | | |
|---|---|---|---|
| 4,913,004 A * | 4/1990 | Panoushek et al. | .......... 477/155 |
| 5,022,509 A | 6/1991 | Schweiger | |
| 5,875,410 A | 2/1999 | Fowler et al. | |
| 5,894,758 A * | 4/1999 | Walker | .......................... 74/335 |
| 6,209,408 B1 * | 4/2001 | DeJonge et al. | ................ 74/335 |
| 6,626,796 B2 | 9/2003 | Schwab et al. | |
| 2002/0139212 A1 * | 10/2002 | DeJonge | ..................... 74/473.3 |
| 2006/0116235 A1 * | 6/2006 | Bachmann et al. | ............. 477/34 |

FOREIGN PATENT DOCUMENTS

| | | |
|---|---|---|
| DE | 40 06 653 A1 | 9/1990 |
| DE | 198 26 861 C1 | 7/1999 |
| DE | 198 41 838 A1 | 3/2000 |
| DE | 100 16 582 A1 | 10/2001 |
| DE | 101 05 749 A1 | 8/2002 |
| EP | 0 784 171 A2 | 7/1997 |

* cited by examiner

*Primary Examiner*—Charles A Marmor
*Assistant Examiner*—Edwin A Young
(74) *Attorney, Agent, or Firm*—Davis Bujold & Daniels, P.L.L.C.

(57) ABSTRACT

A control procedure for an automatic transmission, wherein, via a gear range shifter, a change of the gear range both between the forward travel gear range and the reverse travel gear range and between a fast gear mode and a creeper gear mode can be put into action. A control apparatus selects a transmission gear to be engaged, dependent on data, input by an operator with the aid of a gear range shifter for the manual choice of a driving gear area, whereby the gear range shifter possesses at least a D-shifting position for the selection of a forward travel gear range, an N-position for the selection of an idle running position of the automatic transmission and an R-position for the selection of a reverse travel gear range, and that the automatic transmission can be driven in a fast gear mode as well as in a creeper gear mode.

12 Claims, 1 Drawing Sheet

CONTROL OF AN AUTOMATIC TRANSMISSION BY THE EVALUATION OF THE SPEED OF ACTIVATION OF THE GEAR STAGE RANGE

This application claims priority from German Application Serial No. 10 2004 056 927.4 filed Nov. 25, 2004.

FIELD OF THE INVENTION

The invention concerns a procedure for the control of an automatic transmission.

BACKGROUND OF THE INVENTION

Automatic transmissions have been used for a considerable time in different types of motor vehicles, such as, for example, trucks of medium and heavy weight. Varying from most passenger car transmissions, commercial vehicle transmissions exhibit not only a greater number of gear positions, but include certain gears, which are not provided for use in normal driving operations and are designed to be predominate for starting operations of a loaded vehicle, and/or for use on steep inclines and/or for maneuvering. These additional gears permit very slow movement at a very high torque which is transferred to the gears. In the following, these additional gears are designated as "creeper gears", while the gears used generally for normal driving are termed "fast gears".

Since automatized gear selection apparatuses show in many respects essential advantages in comparison to a manual gear choice made by the driver, these apparatuses are increasingly being installed for heavy vehicles, which employ creeper gears. When this is the case, then, within arm's reach of the driver, at least one gear selection succession is presented, which exhibits three adjustments, namely D, N and R. In the automatized gear range shifter apparatus, in the D-position of the range of gear positions, automatically the respective optimal forward gear is selected without the involvement of the driver or following a displayed confirmation, the driver makes an optional setting of the D-position. When this occurs, the gear to be engaged, for example, is determined with consideration given to: speed of rotation of the motor, motor load, vehicle speed, acceleration, charted motor performance, and possibly additional parameters. In the N-position of the gear range shifter, the transmission is shifted into a neutral position and in the R-position, the reverse gear is engaged, that is to say, the most applicable of various reverse gears is selected.

From his own selection, the driver additionally has a functionally extended gear range shifter by which he can influence an automatic shifting apparatus. This can include, for example, additional shifting positions available to the gear range shifter positions, which can be designated as first, second, third and the like. However, these additional positions considerably diminish the number of the shiftable forward gears. Alternative to this or in addition thereto, the driver often cannot activate, in the given range of gears integrated in the gear range shifter, either an up or down shift. In this situation, the transmission is initiated, to shift one stage up or down from an automatically selected gear. On the other hand, the driver may choose a fully manual mode, for example, by an additional engagement at the M-position of the gear range shifter and shifts the transmission in a method similar to a Tiptronic-Shift wherein the choice is made in a sequential manner and each shifting activation corresponds to a gear change in a chosen direction.

An automatic shifting apparatus in any case cannot reliably discern whether a driver, by his setting of the gear range shifter into the D position of the forward gear range or into the R-position of the reverse gear range, has the intention of moving the vehicle with millimeter precision at creep speed, in order, for example, to carry out an intricate vehicle maneuver or whether the driver plans a normal startup or reverse action. On this account, for the choice of the creep speed mode or the fast mode, it is necessary that an intention of the driver be separately determined and announced.

DE 40 06 653 A1 makes known a shifting apparatus for the semi-automatic shifting of multistage gear change transmissions, which has a gear choice apparatus and a gear range shifter. The said gear range shifter is designed as a rotational shifting means and, besides governing the positions D, N and R, the device can additionally control an M-position, which enables a manual selection of gears. Additionally it is possible that still further positions for shifting programs (not further detailed), namely $X_1$ and $X_2$ can be provided, whereby following the direction of the said rotational shifting means the shift series succession M-D-N-R-$X_1$-$X_2$ becomes available.

Even if, in an extension of the disclosure of DE 40 06 653 A1, an assumption might be made, that the driving programs $X_1$ and $X_2$ are provided for creeper gears in a forward or in a reverse direction, then, in spite of the operational security of the gear range shifter, which passes through a great number of shifting positions, this security is strongly limited, especially in a situation of operation without foresight—that is to say, operation without the driver giving attention to the involved operating elements. In addition, a gear range shifter must be activated to allow exiting from the driving programs $X_1$ or $X_2$ and to obtain the choice of the normal driving position, the same must skip over a great many interposed gear stages.

If, for example, an assumption is made, that $X_1$ represents a creeper gear program for forward movement, a driver finds himself under an obligation to drive a few meters in the direction of a loading ramp or some other targeted position. If, at the desired position and then he would want to precisely position the vehicle, he is obliged to first choose the D-position, in order to subsequently shift through the N-position and the R-position into the $X_1$-position. A smooth switchover between creeper gear and fast gear, in this case, is not possible. In addition, the risk exists of an unforeseen choice of a wrong gear range and especially a gear range in a direction contrary to that desired.

DE 100 16 582 A1 and DE 101 05 749 A1 disclose similar gear range shifters, wherein the positions for forward and reverse creeping gear, however, are to be found at end locations of the rotational scale on different sides and thereby the shift-positions between the reverse travel gear range and the reverse creep gear range are proximal to one another and thus permit safe gear changing. In any case, the switchover between the creep travel gear range for forward and reverse gearing in this instance, requires a shifting movement passing over a number of other gear range. This is quite unfavorable for a maneuvering operation, which often is marked by repeated and quick gear changing between forward and reverse creeper gears.

Giving consideration to the above background, the purpose of the invention is to present a control procedure for an automatic transmission, wherein, by means of a gear range shifter, in a simple and intuitive operational manner for the driver, a change of a gear range can be employed both between the forward gear range and the reverse gear range, as well as between a fast gear mode and a creeper gear mode.

This purpose is achieved by the features of the principal claim, while advantageous embodiments and developments of the invention can be inferred from the subordinate claims.

SUMMARY OF THE INVENTION

The invention bases itself on the principle, that information regarding the intention of the driver can be made evident by the activation of a gear range shifter, not only on the basis of a presently engaged position of the shifting means, but also from the kind of activation and especially from the speed of that activation. The speed of the activation of the gear range shifter, that is to say, the time interval between an exiting from a released position and the acceptance of a desired position of the gear range shifter serves as a criterion as to whether or not the driver desires the engagement of a creeper gear mode or a fast gear mode, that is, to establish an exchange between the stated modes.

BRIEF DESCRIPTION OF THE DRAWING

The invention will now be described, by way of example, with reference to the accompanying drawing in which.

DETAILED DESCRIPTION OF THE INVENTION

Figure 1:
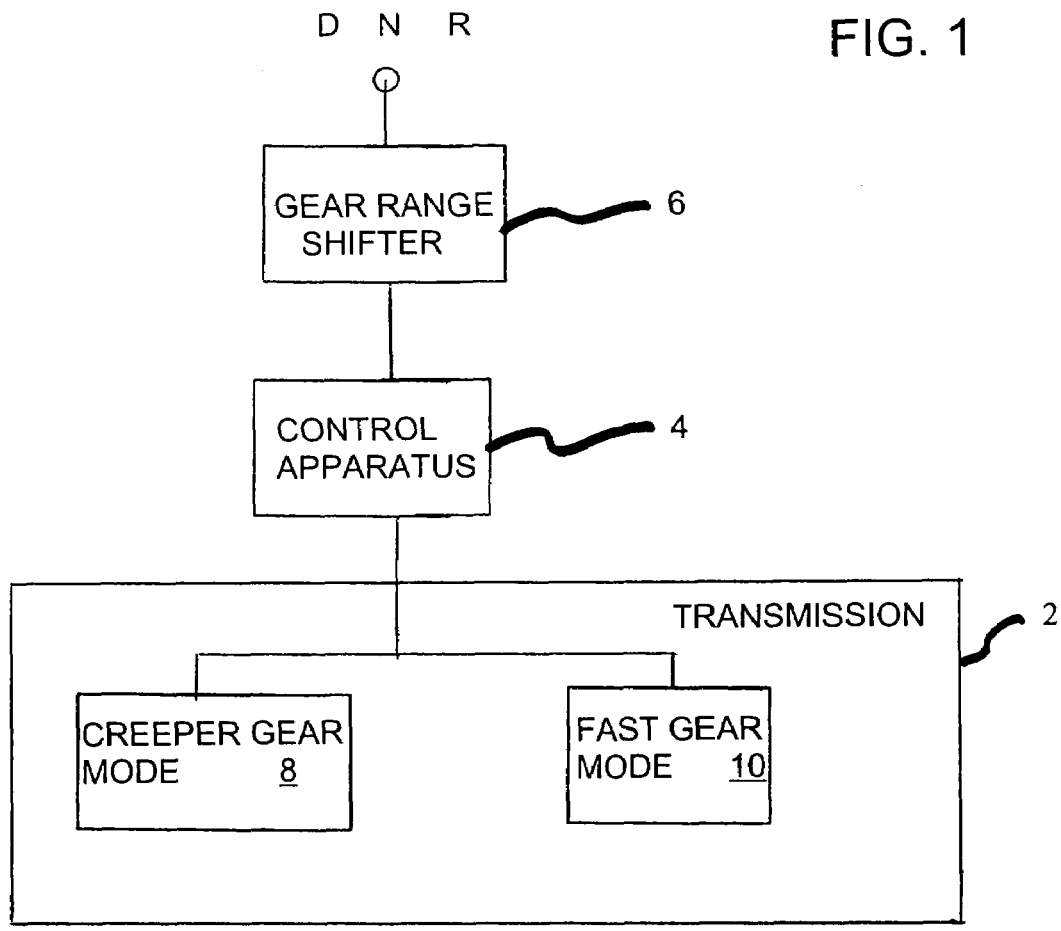
FIG. 1 is a diagrammatic view of an apparatus for controlling an automatic transmission according to the invention.
Figure 2:
FIG. 2 is a diagrammatic view of a rotary shifter.

Accordingly, the invention progresses from a procedure for the control of an automated shifting transmission 2, wherein a control apparatus 4, functioning among a multitude of transmission gears, makes a selection of a transmission gear to be engaged, with the aid of information which has been made available from an operator with the help of a gear range shifter 6 for the manual choosing of a driving gear range, whereby the gear range shifter possesses at least a D-shift position for the selection of a forward gear range, an N-position for the selection of a stillstand condition of the automatic transmission and an R-shifting position for the choice of a reverse travel gear, and wherein the automatic transmission can be operated in a fast gear mode 10 as well as in a creeper mode gear 8.

Accompanying this action, the fast gear mode encompasses particularly that transmission ratio, which, under usual circumstances, would be used in normal driving operation. Contrary to this, in this case, the creeper mode encompasses such gearing as enables a very slow speed of driving and could cause a very high torque to be available on the driven gears. This latter gear would be used first, for maneuvering, but second, could very well be of value on steep inclines and/or in a case of a severe carried load or again, where the driving ground consists of loose soil or sand.

Which gears, i.e., which gear ratios should be respectively selected as creeper gears and which as fast gears, cannot be universally determined, but must be considered in regard to the individual vehicle and must meet its purpose of application and the surmised operational environment. It is also possible, that a classification as to fast and creeper gears is not statistically founded, but is made to fit, in accord with a choice of an operator or dependent upon the ambient physical surroundings. It is also possible that individual gears of both gear range can be used in combination and can thus be engaged both in creeper gear mode as well as in fast mode.

Finally it is possible, that the control can change from creeper gear mode to fast gear mode, without explicit input of the operator, if for example, a certain speed in the highest speed of the creeper gear mode is exceeded and simultaneously the loading demand on the motor remains below an allowed threshold for more than an preselected time. At the least, the forward drive gear range incorporates, besides gearing of the fast mode, also a creeper mode.

It is obvious, that the gear range, which is here designated with D, N and R, can also be referenced by optional other letters, signs or symbols. Also it is possible, that besides the three named shifting positions of the gear range shifter, yet an optional number of additional shifting positions are provided. For example, these additional shifting stations can relate to the upper limits of the selectable gears within one gear range. They can, however, also respectively designate individually discrete gear stages, which can enter into engagement upon the selection of the appropriate shifting position.

To achieve the given purpose, it is additionally provided, that the control apparatus is to at least include an evaluation of the speed of adjustment of the gear range shifter as it makes a decision, whether a creeper gear mode or a fast gear mode should be activated.

The said speed of adjustment, in this respect, can be determined directly by means of a speed sensor, which measures speed in either a rotary or a linear path. It is, however, both simpler and more favorable in cost, to determine the time elapsed between the exiting of one shifting position and the engagement of a targeted position. Finally, it is possible to determine by shifting actions skipping over several shift positions, how long the shifting time took between one or more shift positions, which lie between the abandoned position and the target position. In the most simple case of this, a limiting value can be set. By the under stepping of this limiting value, the corresponding position is either has no validity as shifted or is not detected as shifted. In this case, for example, with a series of R-N-D of the shifting positions, in a rapid change from the R-position into the D-position, the N-position would be either not detected or ignored, wherewith from the known shifting series succession from R direct to N a statement in regard to shifting speed is made evident.

In one embodiment of the invention, provision is made, that the control apparatus shifts the automatic transmission by means of an adjustment of the gear range shifter from the N-position into the D-position or into the R-position. This would be done in a creeper gear mode, if the shifting speed of the gear range shifter lies less than a first limiting value and shifts into a fast gear mode, if the shifting speed lies greater than the limiting value.

Considerations may be made on a basis, that in an everyday, normal operation of a motor vehicle, a desire can arise to shift into the fast gear by a quick activation, since an experienced driver, following the starting of the motor, casually chooses the gear range in the same way as a driver of a passenger vehicle with a manual transmission, without thinking in what way he engages the first gear. Both occur, without the driver applying himself to the procedure and generally even at a relatively high operational speed.

Contrary to this, maneuvering operation or even a starting in deep sand or starting with a heavy load on steep inclines characterizes itself by means of a relatively intended activation of the operational element, whereby the driver applies himself to concentrate entirely on the operation of the vehicle. On this account, it is possible in these situations, that a better procedure would be, that the driver himself, because of the complex operation and increased tension, attends to the gear range shifter in a slower manner. In addition, it is easier for the driver, in this highly attentive driving phase, to let himself remember a likewise critical, i.e. slower operation.

In accord with another variant of the procedure, at any event, it can be provided, that the control apparatus shifts, by means of an adjustment of the gear range shifter from the N-position into the D-position or into the R-position in a creeper mode, if the adjustment speed of the gear range shifter is above a first limiting value but shifts into the fast mode, if the adjustment speed is less than the limiting value.

This can be favorable for vehicles or for application purposes, wherein maneuvering operations take up a major portion of the operation of the vehicle, since then, by means of the rapid shifting movement, the driver is relieved, during the said maneuvering, of having to take cognizance of a slow activation of the gear range shifter. The insignificantly shorter shifting time is, in this case, more of psychological importance than of an operational economic meaning, since the lengthening of the shifting time by means of the slow activation of the gear range shifter is mostly of a duration running clearly less than one second.

While, up to now shifting procedures out of the neutral position have been described, in particular, in the case of maneuverability, shift changes between forward and reverse frequently occur. These are to be explained and described in the following.

In accord with a first variant of a hereto related embodiment, provision can be made, that the control apparatus, by means of an adjustment of the gear range shifter can shift the automatic transmission from the R-position into the D-position, or shift from the D-position into the R-position, while leaving a prior mode intact, if the shifting speed lies above a second limitation. However, if the shifting speed lies at a value less than the second limitation, the control apparatus would effect a change into the respective other mode. This is a favorable action, because a change of mode, thus a change between the creeper mode and the fast mode, or the reverse, comes about very seldom, as compared to a change between forward and reverse gears within the same mode. In addition, from the act of mode changing, an indication is given of a very intended use of the of gear range shifter and also, to a great extent, of a superior degree of attentiveness on the part of the driver. In this way, the known, slow service can be employed by the driver more for a change of mode than for continued operation within the same mode.

However, even here, in certain cases it can be more favorable, to turn the control directly about, namely so, in that the control apparatus permits the prior selected mode to remain in force when it directs the automatic transmission by means of an adjustment of the gear range shifter to shift from the R-position into the D-position or by another adjustment, from the D-position into the R-position, if the speed of adjustment lies less than the second limiting value, but changes into the respective other mode, if the speed of adjustment lies greater than the second limiting value.

This method of operation for control is advantageous for vehicles which frequently approach loading docks with the rear side. This action takes place best when the vehicle is in the creeper mode. In the case of a turn-around of direction, as a rule, there is little reason for operating in a creeper mode, since the vehicle is no longer maneuvering, but, as a rule, starts into a more lengthy stretch of travel. This kind of controlling can also take care, that in a case of choice of a reverse gear from the normal gear selection, only a fast gear would be chosen, if this is demanded by the driver by known, slow, activation of the gear range shifter. Otherwise, a slower and thereby safer creeper gear would be selected.

If during the aforesaid characteristics of the procedure in accord with the invention, a change of mode was activated by a slow/fast activation of the gear range shifter, it would be possible in an alternative, related embodiment, that the driver, independently of the actual, active mode could determine by means of the activation speed of the gear range shifter, could directly determine, whether or not a gear of the creep modus or a gear of the fast gear mode should be applied.

Further in this matter, the control apparatus directs the automatic transmission a demand, by an adjustment of the gear range shifter to shift from the R-position into the D-position or from the D-position into the R-position in the creeper mode, if the speed of the shifting was lower than a third limiting value, and calls for the fast gear mode, insofar as the adjustment speed lies above a the third limiting value.

Since it very well may occur, that a driver brings the gear range shifter, for example, into the R-position, but decides, without actually resetting, to first move a short piece forward, it could happen, that the driver loses sight of which mode he previously activated. This is of little importance to the present variant, since the choice of the mode is independent of the previously activated mode.

In many cases, and analogous to already made embodiments, it is of advantage, in a case of a known, small activation speed, to activate the creeper gear mode and at a more rapid vehicle speed, to activate the fast gear mode, in order that in normal road driving, the fast gear mode may be selected at rapid activation speeds.

However, even in this case, it is possible that the exactly reversed control operation can be of value in certain circumstances, namely the control apparatus directs the automatic transmission, by means of an adjustment of the gear range shifter, to shift from the R-position into the D-position or to shift by changing from the D-position into the R-position in the creeper mode, if the shifting speed lies above a third limiting value, and shifts in the fast mode, if the shifting speed lies less than the third limiting value.

In particular, this is a case for vehicles, wherein the maneuvering operations make up an essential part, or the greater part their operation, since the driver of this maneuvering vehicle can then, in a routine manner, with a rapid shifting between the R-position and the D-position individually select the creeper gear mode.

Especially, with some of the last named procedure variants, it can be of value to determine what is to occur in the case of a choice of the N-position—besides the shifting of the transmission into a neutral state.

In the most simple case, when in the N-position gear of the gear range shifter, the transmission runs, in reference to the mode, again in an idling basic position, whereby, upon the next gear setting in the D-position or the R-position, the mode to be selected is dependent upon the speed of the shifting. For this procedure, as described in the opening passages, however, it is necessary also, by the adjustment of the gear range shifter between two neighboring shift positions to determine a shifting speed, which subsequently calls for an increase in cost.

Considerably simpler, in the determination of shifting speed, is a shift movement skipping at least one intermediate position, thus, for example, from D through N to R, or the reverse thereof. First, as the shifting path increases, so does the shifting time, so that the determination of the speed value would be easier, second, many shifting devices are so designed, so that they retain one shift position intact over a relatively large shifting path, in order that by pretensioned springs, the said devices can change very rapidly into the neighboring shift state. In the case of this type of shifting, because of the activation between two neighboring shifting positions, the determination of the activation speed cannot be computed out of the shift-signals or the determination can only be computed at an unreasonably high cost. Insofar as these shifting devices, however, are shifted only between two positions, then the determination of a measurement for the activation speed is possible by means of the time interval of the functioning of the shifting device in the intermediate position is very simple and comfortable.

It is fully in accord with shifting technology and relates to the evaluation effort in the determination of the speed of actuation of the gear range shifter, and particularly favorable if the control apparatus of the automatic transmission, first, by a direction from the gear range shifter to change from the R-position or the D-position into the N-position and second places it in the creeper mode by a retention of the range shifter in this N-position for a period of time above a fourth limiting value.

This represents a choice of the creeper mode during slow shifting and beyond this, leads to a preinstallation of the creeper gear mode at the choice of the N-position. This preinstallation can especially be of value for maneuvering vehicles, particularly in connection with disclosed shifting processes, since here, by the first shifting, after the setting of an idle run, first the slower and thereby safer creeper gear mode is activated. If the driver desires the fast gear mode, then this said mode can be engaged with little effort, in that the driver, first chooses the R-position and immediately thereafter shifts into the D-position with appropriate rapidity, this being also true in a reversed sequence.

Obviously, the above may be advantageous for many applications, if the control apparatus first, activates the automatic transmission by a demand of the gear range shifter to shift from the R-position or the D-position into the N-position and second, engages the fast gear mode by a retention of the gear range shifter in the said N-position for a period of time greater than a fourth limiting value in the fast gear mode. In this way, a fast gear is automatically made available, after a selection of the idle run by the first selection of the driving gear, which is favorable, especially in normal driving practice.

For all the above explained procedures, it is desirable, that the currently activated mode and/or the change of the mode, be made known to the driver in an acoustic manner, and/or optically and/or by a sense of touch. In this way, the driver is continually made aware of the mode in force, that is to say, he would be made especially aware thereof in a case of a mode change.

For the implementation of the invented procedure, it is advantageous if the gear range shifter is a rotary shifter, preferably a rotary shifter with exactly three shift positions.

Rotary shifters are especially advantageous in cockpit arrangements and a rotary shifter 12 with only three shifting positions is particularly excellent without having to optically seek them out—thus the driver need not take his eyes from the street traffic. Obviously the invented procedure can allow itself to be used with other operational elements and especially functions with disk shifting or with floor shifting apparatuses in accord with the type of conventional shifting paths for passenger vehicles having automatic shifting. Also, consideration can be given to the fact, that besides the described three shifting position, additional shifting positions can be provided for special purposes. In this case, however, a clearly touch sensitive separation of the positions D, N and R from the other positions is advisable, in order to make possible a blind operation free of question.

The invention claimed is:

1. A method for controlling an automatic transmission, the method comprising the steps of:
    selecting, via a control apparatus, one transmission gear to be engaged, from a plurality of transmission gear stages to be engaged, with consideration given to data which is input from an operator with aid of a gear range shifter for a manual choice of a gear range,
    providing the gear range shifter with at least a D-shift position for selection of a forward gear range, an N-position for selection of an idle position of the automatic transmission and an R-shift position for selection of a reverse direction gear area, and the automatic transmission having both a fast gear mode as well as a creeper gear mode,
    contributing, via at least the control apparatus, to evaluation of an adjustment speed of the gear range shifter to determine whether one of the creeper gear mode or the fast gear mode should be engaged.

2. The method according to claim 1, further comprising the step of shifting the automatic transmission, into the creeper gear mode, via the control apparatus by adjustment of the gear range shifter from the N-position into one of the D-position or the R-position, if the adjustment speed of the gear range shifter lies less than a first limiting value and shifting, into the fast gear mode, if the adjustment speed lies at a value greater than the limiting value.

3. The method according to claim 1, further comprising the step of shifting the automatic transmission, into the creeper gear mode, via the control apparatus by an adjustment of the gear range shifter from the N-position into one of the D-position or the R-position, if the adjustment speed of the gear range shifter lies greater than a first limiting value and shifting, into the fast gear mode, if the adjustment speed lies less than the limiting value.

4. The method according to claim 1, further comprising the step of shifting the automatic transmission via the control apparatus, by adjustment of the gear range shifter from the R-position into the D-position or by an adjustment from the D-position into the R-position, therewith retaining the prior engaged mode, if the speed of adjustment lies greater than a second limiting value and changing into the respective other mode, if the adjustment speed lies less than the second limiting value.

5. The method according to claim 1, further comprising the step of shifting the automatic transmission via the control apparatus by adjustment of the gear range shifter from the R-position into the D-position or by adjustment of the D-position into the R-position, therewith retaining the prior engaged mode, if the speed of adjustment lies less than a second limiting value and changing into the respective other mode if the adjustment speed lies in excess of the second limiting value.

6. The method according to claim 1, further comprising the step of shifting the automatic transmission via the control apparatus by adjustment of the gear range shifter from the R-position into the D-position or by adjustment from the D-position into the R-position and engaging the creeper gear mode, if the adjustment speed lies less than a third limiting value and engaging the fast gear mode if the adjustment speed lies in excess of the third limiting value.

7. The method according to claim 1, further comprising the step of shifting the automatic transmission via the control apparatus by adjustment of the gear range shifter from the R-position into the D-position or by adjustment from the D-position into the R-position and engaging the creeper gear mode, if the adjustment speed lies in excess of a third limiting value and engaging the fast gear mode, if the adjustment speed lies less than a third limiting value.

8. The method according to claim 1, further comprising the step of shifting the automatic transmission via the control apparatus by adjustment of the gear range shifter from one of the R-position or the D-position into the N-position and placing a retention of the gear range shifter in the N-position in the creeper gear mode for a time interval in excess of a fourth limiting value.

9. The method according to claim 1, further comprising the step of shifting the automatic transmission via the control apparatus by adjustment of the gear range shifter from one of the R-position or the D-position into the N-position and placing a retention of the gear range shifter in the fast gear mode in the N-position for a time interval greater than a fourth limiting value.

10. The method according to claim 1, further comprising the step of declaring one or more of the respectively active mode and the change of the mode to the driver via at least one of acoustically, optically and by a sense of touch.

11. An apparatus for controlling an automatic transmission the apparatus comprising:

a control apparatus selects, from a plurality of transmission gear stages, one transmission gear to be engaged with consideration given to data which is input from an operator with aid of a gear range shifter for a manual choice of a gear range, the gear range shifter possesses at least a D-shift position for selection of a forward gear range, an N-position for selection of an idle position of the automatic transmission and an R-shift position for selection of a reverse direction gear area, and the automatic transmission having both a fast gear mode as well as a creeper gear mode, the control apparatus at least contributes to evaluation of adjustment speed of the gear range shifter to determine whether one of the creeper gear mode or the fast gear mode should be engaged, and the gear range shifter is a rotary shifter.

12. The apparatus according to claim 11, wherein the rotary shifter has exactly three shift positions.

* * * * *